United States Patent
Huang et al.

(10) Patent No.: US 10,929,212 B2
(45) Date of Patent: Feb. 23, 2021

(54) METHOD OF RUNNING NETWORK APPLICATION BASED ON POS PAYMENT TERMINAL, TERMINAL, AND NON VOLATILE READABLE STORAGE MEDIUM

(71) Applicant: PAX COMPUTER TECHNOLOGY (SHENZHEN) CO., LTD, Guangdong (CN)

(72) Inventors: Lei Huang, Guangdong (CN); Sining Ye, Guangdong (CN); Lihong Xie, Guangdong (CN)

(73) Assignee: PAX COMPUTER TECHNOLOGY (SHENZHEN) CO., LTD, Guangdong (CN)

( * ) Notice: Subject to any disclaimer, the term of this patent is extended or adjusted under 35 U.S.C. 154(b) by 37 days.

(21) Appl. No.: 16/471,195

(22) PCT Filed: Sep. 13, 2017

(86) PCT No.: PCT/CN2017/101548
§ 371 (c)(1),
(2) Date: Jun. 19, 2019

(87) PCT Pub. No.: WO2018/153061
PCT Pub. Date: Aug. 30, 2018

(65) Prior Publication Data
US 2019/0377621 A1 Dec. 12, 2019

(30) Foreign Application Priority Data
Feb. 24, 2017 (CN) .......................... 201710104483.3

(51) Int. Cl.
*G06F 9/54* (2006.01)
*G07G 1/00* (2006.01)
(Continued)

(52) U.S. Cl.
CPC ............ *G06F 9/548* (2013.01); *G06F 3/0484* (2013.01); *G06F 9/44526* (2013.01); *G07G 1/0009* (2013.01)

(58) Field of Classification Search
None
See application file for complete search history.

(56) References Cited

U.S. PATENT DOCUMENTS 9,164,816 B2 * 10/2015 Auvray ................... G06F 9/541
10,140,103 B2 * 11/2018 Zheng ....................... G06F 8/71
(Continued)

FOREIGN PATENT DOCUMENTS

| CN | 101958932 | 1/2011 |
| CN | 102693238 | 9/2012 |

(Continued)

OTHER PUBLICATIONS

International Search Report filed in PCT/CN2017/101548 dated Nov. 3, 2017.

*Primary Examiner* — Umut Onat
(74) *Attorney, Agent, or Firm* — Rankin, Hill & Clark LLP

(57) ABSTRACT

A method of running a network application based on a Point-of-Sale (POS) terminal is provided. The method includes: receiving an operation on a network application; calling a first interface of a JAVASCRIPT layer according to the operation; parsing the first interface and acquiring an object corresponding to the first interface; transmitting a corresponding signal through the object and executing a slot function associated with the signal; calling a second interface of a plug-in layer through the slot function, and calling a hardware module corresponding to the second interface to perform the operation. The POS payment terminal traverses and accesses nodes in an object tree through an embedded graphical user interface system according to a node hierar- (Continued)

chy relationship in the object tree, and renders various tag objects contained in the object tree one by one to display a network application page on a display screen of the POS payment terminal.

15 Claims, 5 Drawing Sheets

(51) Int. Cl.
*G06F 9/445* (2018.01)
*G06F 3/0484* (2013.01)

(56) References Cited

U.S. PATENT DOCUMENTS

| | | | |
|---|---|---|---|
| 2014/0098118 A1* | 4/2014 | Liu | ............ G06T 1/00 345/522 |
| 2017/0109720 A1* | 4/2017 | Zheng | ............ G06Q 20/3563 |
| 2020/0159789 A1* | 5/2020 | Dong | ............ G06F 9/451 |

FOREIGN PATENT DOCUMENTS

| | | |
|---|---|---|
| CN | 103064667 | 4/2013 |
| CN | 103713891 | 4/2014 |
| CN | 106897066 | 6/2017 |

* cited by examiner

METHOD OF RUNNING NETWORK APPLICATION BASED ON POS PAYMENT TERMINAL, TERMINAL, AND NON VOLATILE READABLE STORAGE MEDIUM

This application claims priority to Chinese Patent Application No. 201710104483.3, filed with China National Intellectual Property Administration on Feb. 24, 2017, and titled "method and device of running network application based on POS payment terminal", the content of which is incorporated herein by reference in entirety.

TECHNICAL FIELD

The present disclosure relates to the field of computer technology, and more particularly to a method of running network application based on a POS payment terminal, a terminal and a non-volatile readable storage medium.

BACKGROUND

Currently, applications running on the POS (Point Of Sale, payment terminal) machine are basically developed by the conventional original development languages such as C/C++, JAVA, etc. The applications which are developed by the conventional original development languages including C/C++ and JAVA may directly call the various hardware modules in the POS machine to perform operations such as card reading, PIN (Personal Identification Number) input, data encryption and data decryption, displaying of prompt information, and the like, thereby realizing a payment function of the POS machine. However, the traditional POS may only operate an application developed by the languages including C/C++ and JAVA, which causes the difficulty in developing POS machine applications to be high, so that higher development cost needs to be spent.

SUMMARY

According to the various embodiments of the present disclosure, a method of running network application based on POS terminal, a terminal and a non-volatile readable storage medium are provided.

A method of running network application based on a POS payment terminal, including steps of:
  receiving an operation on a network application;
  calling a first interface of a JS layer according to the operation;
  parsing the first interface and acquiring an object corresponding to the first interface;
  transmitting a corresponding signal through the object and executing a slot function associated with the signal; and
  calling a second interface of a plug-in layer through the slot function, and calling a hardware module corresponding to the second interface to perform the operation.

A terminal, including a memory and a processor, the memory stores a computer executable instruction, when the computer executable instruction is executed by the processor, the processor is caused to perform following steps of:
  receiving an operation on a network application;
  calling a first interface of a JS layer according to the operation;
  parsing the first interface and acquiring an object corresponding to the first interface;
  transmitting a corresponding signal through the object and executing a slot function associated with the signal; and
  calling a second interface of a plug-in layer through the slot function and calling a hardware module corresponding to the second interface to perform the operation.

One or a plurality of non-volatile readable storage medium storing a computer executable instruction, when the computer executable instruction is executed by one or a plurality of processors, the one or plurality of processors are caused to perform following steps of:
  receiving an operation on a network application;
  calling a first interface of a JS layer according to the operation;
  parsing the first interface and acquiring an object corresponding to the first interface;
  transmitting a corresponding signal through the object and executing a slot function associated with the signal; and
  calling a second interface of a plug-in layer through the slot function and calling a hardware module corresponding to the second interface to perform the operation.

The details of one or more embodiments in the present disclosure are proposed in the following accompanying figures and descriptions. Other technical features, objectives and advantages in the present disclosure will become obvious from the description, the accompanying figures and the claims.

BRIEF DESCRIPTION OF THE DRAWINGS

In order to explain the embodiments of the present disclosure more clearly, a brief introduction regarding the accompanying drawings that need to be used for describing the embodiments of the present disclosure or the related art is given below; it is obvious that the accompanying drawings described as follows are only some embodiments of the present disclosure, for the person of ordinary skill in the art, other drawings may also be obtained according to the current drawings on the premise of paying no creative labor.

DESCRIPTION OF THE EMBODIMENTS

In order to make the purpose, the technical solution and the advantages of the present disclosure be clearer and more understandable, the present disclosure will be further described in detail below with reference to accompanying figures and embodiments. It should be understood that the specific embodiments described herein are merely intended to illustrate but not to limit the present disclosure.

Figure 1:
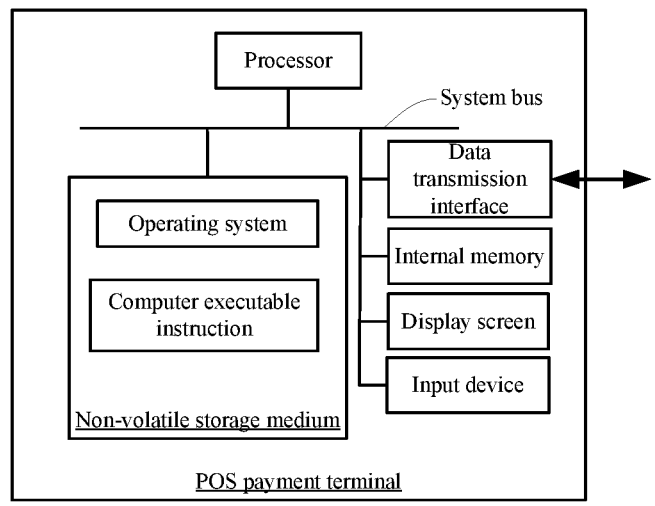
FIG. 1 depicts a block diagram of a POS terminal in one embodiment.

FIG. 1 depicts a block diagram of a POS payment terminal in one embodiment. As shown in FIG. 1, the POS payment terminal includes a processor connected through a system bus, a non-volatile storage medium, an internal memory, a data transmission interface, a display screen and an input device. The memory of the POS payment terminal includes a non-volatile storage medium and an internal memory, where the non-volatile storage medium of the POS payment terminal stores an operating system and a computer executable instruction, when the computer executable instruction is executed by the processor, the method of running network application based on the POS payment terminal provided in the embodiment of the present disclosure is implemented. The processor is configured to provide calculation and control capability, and support the operation of the whole POS payment terminal. The internal memory in the POS payment terminal provides an environment for the operation of the computer executable instruction in the non-volatile storage medium. The data transmission interface is configured to communicate with other computer equipment and may be a USB (Universal Serial Bus) interface, a network interface, etc. For example, the data transmission interface is connected with PC (Personal Computer) through the USB interface and transmits payment data, and the like. The display screen of the POS payment terminal may be a LCD (Liquid Crystal Display) screen or be an electronic ink display screen, and the like, the input device may be a touch layer covered on the display screen and may also be a key arranged on the outer shell of the POS payment terminal. In this embodiment, the POS payment terminal may be a POS machine, or be a portable POS machine, a wireless POS machine and the like. The person of ordinary skill in the art may understand that the structure shown in FIG. 1 is merely the structural block diagram of the part associated with the technical solution of the present disclosure, which doesn't be constituted as the limitation to the POS payment terminal which the technical solution of the present disclosure is applied on. Specifically, the POS payment terminal may include more or less components than the components shown in FIG. 1, or combine certain components or have different component arrangement.

Figure 2:
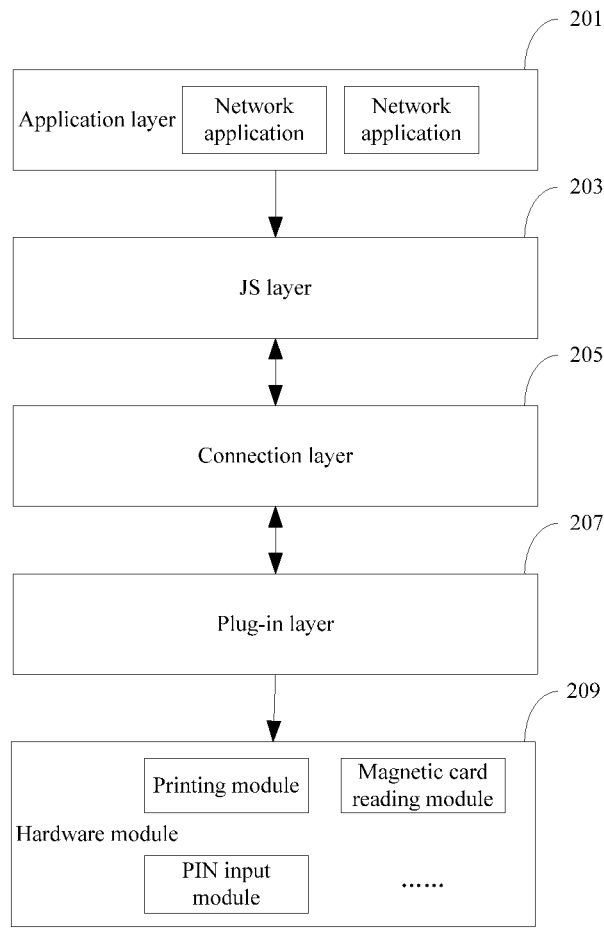
FIG. 2 depicts a system architecture diagram of the interior of the POS payment terminal in a method of running network application based on the POS terminal in one embodiment.

FIG. 2 depicts a system architecture diagram of the interior of the POS payment terminal in the method of running network application based on the POS payment terminal in one embodiment. As shown in FIG. 2, the POS payment terminal receives an operation on the network application from a user through an application layer 201, and calls a first interface of a JS (JavaScript) layer according to the operation. The POS payment terminal parses the called first interface through a connection layer 205 and acquires an object corresponding to the first interface. The POS payment terminal transmits a corresponding signal through the object which is acquired through the connection layer 205, and executes a slot function associated with the signal. The POS payment terminal calls a second interface of a plug-in layer 207 through the slot function, and calls a hardware module 209 corresponding to the second interface to perform corresponding operation.

Figure 3:
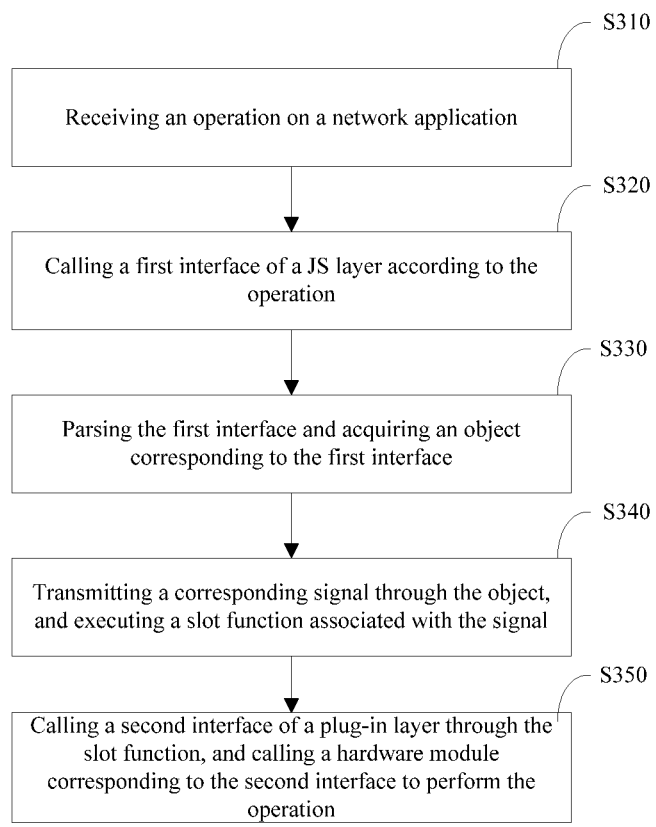
FIG. 3 depicts a flow diagram of the method of running network application based on the POS terminal in one embodiment.

As shown in FIG. 3, in one embodiment, a method of running network application based on the POS payment terminal is provided, this method may be applied to the POS payment terminal as shown in FIG. 1 and includes following steps:

Step 310, receiving the operation on the network application.

The network application refers to the application software which uses a browser to perform an operation over a network such as the Internet, the network application is generally developed and written through a webpage language such as HTML (Hypertext Markup Language), JavaScript and so on.

In one embodiment, the user may operate the network application on the POS payment terminal, where the operation may include a card swiping operation, a payment voucher printing operation, a password verification operation, etc., the user may trigger an operation event by selecting the corresponding key provided in the touch control network application.

Step 320, calling the first interface of the JS layer according to the operation.

The POS payment terminal receives the operation of the user on the network application, and may call the first interface provided by the JS layer according to the operation, the various first interfaces provided by the JS layer have one-to-one correspondence relationship with the system interfaces of the various hardware modules of the POS payment terminal, where the system interfaces of the various hardware modules of the POS payment terminal are generally developed by C/C++ language; thus, the network applications written by languages such as HTML, JavaScript and so on may not directly call the hardware modules for use. The POS payment terminal may call the first interface of the corresponding JS layer according to the hardware modules required by the user selected operation, the network application may call the hardware modules of the POS payment terminal to perform corresponding operation through the first interface of the JS layer.

Step 330, parsing the first interface and acquiring an object corresponding to the first interface.

The POS payment terminal may create the connection layer in advance and take the connection layer as an intermediate between the JS layer and the various hardware modules, such that the network application accesses the various hardware modules of the POS payment terminal through the called first interface of the JS layer. The POS payment terminal may parse the called first interface of the JS layer through a JavaScriptCore interpreter in the connection layer, and execute JS function of the first interface.

In one embodiment, before the network application is executed by the POS payment terminal, the various first interfaces of the network application in the JS layer may be registered in the JavaScriptCore interpreter by the POS payment terminal using an AddJavaScriptlnterface function through the connection layer, and JavaScript objects corresponding to the various first interfaces may be created at the time of registration. The POS payment terminal parses the called first interface through the JavaScriptCore interpreter in the connection layer, and may acquire a pre-created JavaScript object corresponding to the first interface.

Step 340, transmitting a corresponding signal through the object, and executing a slot function associated with the signal.

When the POS payment terminal registers the various first interfaces of the JS layer of the network application on the JavaScriptCore interpreter through the connection layer and creates corresponding JavaScript objects, signals of the various JavaScript objects and the slot functions associated with the signals may be defined, respectively. The signal and the slot are essentially two high-level interfaces, and may be applied to communication between objects, one signal may be associated with one or more slots, multiple signals may also be associated with the same slot, the signal and the slot may be used for replacing a function pointer.

When a pre-created JavaScript object corresponding to the first interface is obtained and executed by the POS payment terminal through the JavaScriptCore interpreter in the connection layer, the signal of the JavaScript object may be transmitted, and a corresponding slot function may be executed when the signal is received by a slot associated with the signal.

Step 350, calling a second interface of a plug-in layer through the slot function and calling the hardware module corresponding to the second interface to perform the operation.

The slot function may include the second interface of the plug-in layer, the system interfaces of the various hardware modules of the POS payment terminal may be encapsulated in advance, so that the corresponding second interfaces are acquired. The POS payment terminal transmits the signal of the object corresponding to the called first interface through the JavaScriptCore interpreter, and executes the slot function associated with the signal, so that the second interface of the plug-in layer corresponding to the required hardware module may be called through the slot function. The POS payment terminal may call the corresponding hardware module to perform the operation as required by the user through the second interface of the plug-in layer.

The aforesaid method of running network application based on the POS payment terminal is described by examples. In one embodiment, a user selects a payment voucher printing operation on the network application of the POS payment terminal, the hardware module corresponding to the printing payment voucher operation is a printing module. The POS payment terminal calls a first interface fun_A of the JS layer corresponding to a system interface fun_A of the printing module, and parses the first interface fun_A through the JavaScriptCore interpreter of the connection layer to obtain a pre-created object A corresponding to the first interface fun_A. The POS payment terminal transmits a signal a through the object A, when a slot associated with the signal a receives the signal a, the slot function is executed, and a second interface _fun_a of the plug-in layer is called through the slot function, the second interface _fun_a is acquired by encapsulating the system interface fun_a of the printing module. The POS payment terminal may call the printing module to print by executing the second interface _fun_a of the plug-in layer.

According to the aforesaid method of running network application based on the POS payment terminal, the operation on the network application is received, and the first interface of the JS layer is called according to the operation, the first interface is parsed and the corresponding object is acquired, the corresponding signal is transmitted through the object, and the slot function associated with the signal is executed, the second interface of the plug-in layer is called through the slot function, and the hardware module corresponding to the second interface is called to perform the operation, such that the network application on the POS payment terminal may be normally executed and use the functions of the various hardware modules in the POS machine, the difficulty in developing POS machine application is effectively reduced, and a development cost is reduced.

Figure 4:
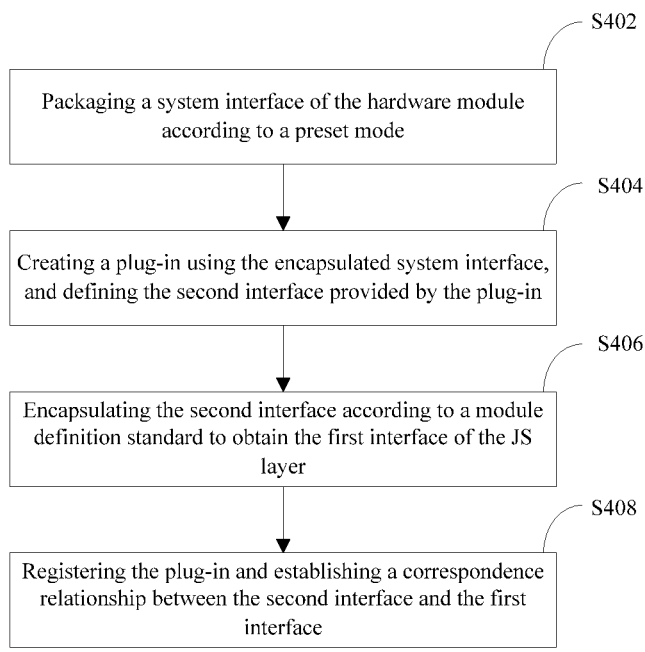
FIG. 4 depicts a flow diagram of a step of encapsulating a system interface of hardware module in one embodiment.

As shown in FIG. 4, in one embodiment, before receiving the operation on the network application in the step 310, the method further includes the following steps:

Step 402, encapsulating the system interface of the hardware module according to a preset mode.

In one embodiment, the system interfaces of the various hardware module may be encapsulated in a preset manner, for example, according to an encapsulation mode provided by Cordova, C/C++ system interfaces of the various hardware modules are encapsulated into a JSON (JavaScript Object Notation) format, where the Cordova provides a set of equipment related application programming interfaces, such that the network application may access original equipment functions such as a camera, a microphone and so on using JavaScript, according to the set of application program programming interfaces.

Step 404, creating a plug-in using the encapsulated system interface, and defining a second interface provided by the plug-in.

After the system interfaces of the various hardware modules are encapsulated into the JSON format, these system interfaces may be added into the plug-in layer of the POS payment terminal in the plug-in format respectively, and a configuration file may be established to configure the plug-in that is added into the plug-in layer and define the basic information of the plug-in; where the basic information of the plug-in includes a plug-in name, a plug-in identifier, a second interface capable of being called, etc. The plug-in may be called by the POS payment terminal by accessing the second interface provided by the plug-in, so that the system interfaces of the hardware modules contained in the plug-in may be called.

Step 406, encapsulating the second interface according to a module definition standard to acquire the first interface of the JS layer.

The second interfaces of the various plug-ins in the plug-in layer may be encapsulated respectively according to a CMD (Common Module Definition) module definition standard, so that the first interface of the JavaScript format is acquired, and a modularization of the JS layer is implemented, the encapsulated first interfaces may correspond to the various hardware modules of the POS payment terminal, respectively. The format of the CMD module definition standard is define (factory), where the define is used for defining the modules, and the factory may be a function, an object or a character string.

Step 408, registering the plug-in and establishing a correspondence relationship between the second interface and the first interface.

The added plug-in may be registered in a system configuration file of the POS payment terminal, such that the network application on the POS payment terminal may call the plug-in and establish a correspondence relationship between the second interface which is provided by the plug-in and the first interface which is acquired by encapsulating the second interface.

Figure 5:
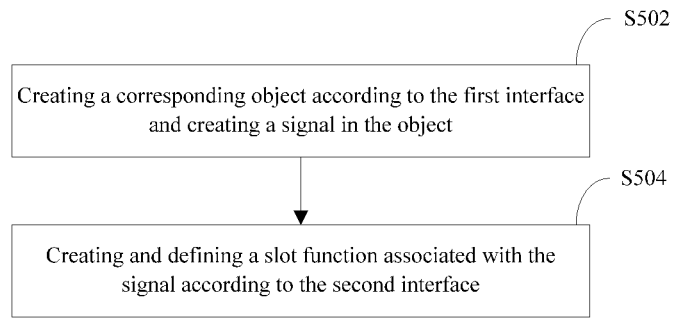
FIG. 5 depicts a flow diagram of establishing a correspondence relationship between a first interface and a second interface in one embodiment.

As shown in FIG. 5, in one embodiment, registering the plug-in and establishing a correspondence relationship between the second interface and the first interface in the step 408 further includes the following steps:

In step 502, creating a corresponding object according to the first interface, and creating a signal in the object.

The POS payment terminal may register the various first interfaces of the JS layer of the network application to the JavaScriptCore interpreter through the connection layer, and create JavaScript objects corresponding to the various first interfaces. When the JavaScript object is created, the signal of the JavaScript object may be defined.

In step 504, creating and defining a slot function associated with the signal according to the second interface.

After the signal of the created JavaScript object is defined by the POS payment terminal through the JavaScriptCore interpreter of the connection layer, the slot function associated with the signal may be created in the plug-in layer, and the first interface and the second interface acquired by encapsulation are defined as member functions of the slot, then, the signal is correlated with the slot function, so that the correspondence relationship between the first interface and the second interface is established; where the function parameter format of the slot function needs to be consistent with the function parameter format of the signal. When the first interface of the JS layer is called, the POS payment terminal acquires the object corresponding to the first interface through the JavaScriptCore interpreter of the connection layer and transmits the signal of the object; when the slot associated with the signal receives the signal, the corresponding slot function is executed, so that the second interface corresponding to the first interface may be called successfully.

In this embodiment, the system interfaces of the various hardware modules in the POS payment terminal are encapsulated and are added into the plug-in layer in the plug-in format, the correspondence relationship between the first interface and the second interface is established through the correlation between the signal and the slot, such that the network application on the POS payment terminal may be normally executed and use the functions of the various hardware modules in the POS machine, the difficulty in developing the POS machine application is effectively reduced, and the development cost is reduced.

In one embodiment, before receiving the operation on the network application in the step 310, the method further includes: loading and rendering a network application page through an embedded GUI (Graphical User Interface) system.

In one embodiment, when the network application page is opened by the POS payment terminal, the network application page may be loaded and rendered by the POS payment terminal according to the embedded GUI system, where the embedded GUI system may include MicroWindows, open GUI, Qt/embedded, etc. In this embodiment, the POS payment terminal may use QtWebkit engine to load and render the network application page, the QtWebkit engine has the functions such as rendering HTML (Hypertext Markup Language), XHTML (Extensible Hypertext Markup Language) and SVG (Scalable Vector Graphics), using CSS (Cascading Style Sheet) to typeset and executing the JavaScript, and so on, such that rendering is directly performed by the embedded GUI system Qt based on Webkit, and the function of browser is directly provided.

Figure 6:
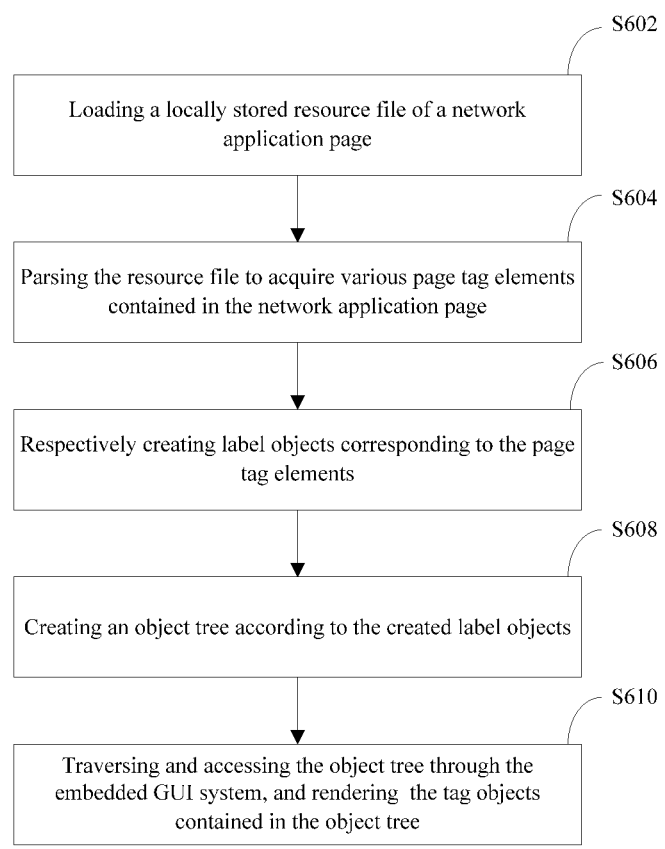
FIG. 6 depicts a flow diagram of loading and rendering a network application page through a GUI system in one embodiment.

As shown in FIG. 6, in one embodiment, the step of loading and rendering the web application page through the embedded GUI system includes the following steps:

Step 602, loading a locally stored resource file of the network application page.

When the POS payment terminal opens the network application page, the resource file of the network application page stored in the local file system of the POS payment terminal may be acquired; where the resource file may include a HTML file, a CSS file, a JS file, an SVG file and the like.

Step 604, parsing the resource file to acquire various page tag elements contained in the network application page.

The POS payment terminal may parse the resource file through a parser of the Webkit engine to obtain the various page tag elements contained in the network application page, the page tag elements are basic component units of the network application page, and the page tag elements usually occur in pair, each page tag element may include a starting tag, an ending tag, an annotation tag, a character style tag, a graphic tag, and the like, and it is not limited by these tags, page tag elements contained in the network application page are also different with the difference of network application pages.

Step 606, creating the tag objects corresponding to the various page tag elements respectively.

The POS payment terminal may respectively create tag objects corresponding to the various page tag elements through the Webkit engine according to the various page tags contained in the network application page which is parsed by the parser of the Webkit engine, and create an object tree according to the created tag object, take the created tag objects as nodes in the object tree and add the tag objects in the object tree according to the structure of the resource file, so that the parsed resource file may be described through the created object tree.

Step 608, creating the object tree according to the created tag object.

Step 610, traversing and accessing the object tree through an embedded GUI system, and rendering the tag objects contained in the object tree.

The POS payment terminal may traverse and access the various nodes in the object tree through the embedded GUI system according to a node hierarchy relationship in the object tree, and render the various tag objects contained in the object tree one by one, such that the network application page may be displayed on the display screen of the POS payment terminal.

In this embodiment, the network application page may be loaded and rendered, as compared to the traditional POS machine application developed by C/C++ language, the network application has more diversified interface displays; meanwhile, the difficulty in developing network application is lower, and the development cost is reduced.

Figure 7:
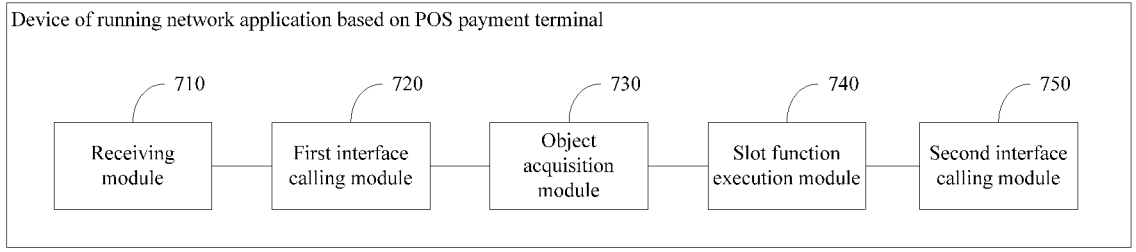
FIG. 7 depicts a block diagram of a device of running network application based on the POS payment terminal in one embodiment.

As shown in FIG. 7, in one embodiment, a device of running a network application based on a POS payment terminal is provided, this device includes a receiving module 710, a first interface calling module 720, an object acquisition module 730, a slot function execution module 740 and a second interface calling module 750.

The receiving module 710 is configured to receive an operation on the network application.

The first interface calling module 720 is configured to call a first interface of a JS (JavaScript) layer according to the operation.

The object acquisition module 730 is configured to parse the first interface and acquire an object corresponding to the first interface.

The slot function execution module 740 is configured to transmit a corresponding signal through the object and execute a slot function associated with the signal.

The second interface calling module 750 is configured to call a second interface of a plug-in layer through the slot function, and call a hardware module corresponding to the second interface to perform the operation.

According to the aforesaid device of running network application based on POS payment terminal, the operation on the network application is received, and the first interface of the JS layer is called according to the operation, the first interface is parsed and the corresponding object is acquired, the corresponding signal is transmitted through the object, and the slot function associated with the signal is executed, the second interface of the plug-in layer is called through the slot function, and the hardware module corresponding to the second interface is called to perform the operation, such that the network application on the POS payment terminal may be normally executed and use the functions of the various hardware modules in the POS machine, the difficulty in developing POS machine application is effectively reduced, and a development cost is reduced.

Figure 8:
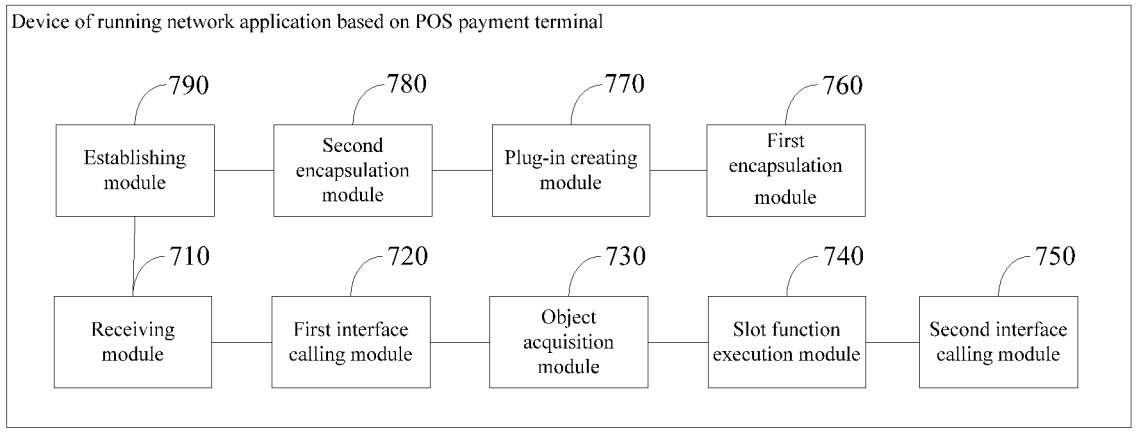
FIG. 8 depicts a block diagram of a device of running network application based on the POS payment terminal in another embodiment.

As shown in FIG. 8, in one embodiment, except that the device of running network application based on POS payment terminal includes the receiving module 710, the first interface calling module 720, the object acquisition module 730, the slot function execution module 740 and the second interface calling module 750, the device of running network application based on POS payment terminal further includes a first encapsulation module 760, a plug-in creating module 770, a second encapsulation module 780 and an establishing module 790.

The first encapsulation module 760 is configured to encapsulate a system interface of the hardware module according to a preset mode.

The plug-in creating module 770 is configured to create a plug-in using the encapsulated system interface and define a second interface provided by the plug-in.

The second encapsulation module 780 is configured to encapsulate the second interface according to a module definition standard so as to obtain a first interface of the JS layer.

The establishing module 790 is configured to register the plug-in and establish a correspondence relationship between the second interface and the first interface.

Figure 9:
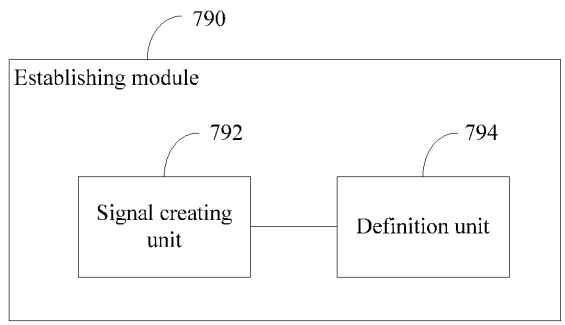
FIG. 9 depicts a block diagram of an establishing module in one embodiment.

As shown in FIG. 9, in one embodiment, the establishing module 790 includes a signal creating unit 792 and a definition unit 94.

The signal creating unit 792 is configured to create a corresponding object according to the first interface and create a signal in the object.

The definition module 794 is configured to create and define a slot function associated with the signal according to the second interface.

In this embodiment, system interfaces of the various hardware modules of the POS payment terminal are encapsulated and are added into the plug-in layer in a plug-in format, and the correspondence relationship between the first interface and the second interface is established through the correlation between the signal and the slot, such that the network application on the POS payment terminal may be normally performed and use the functions of the various hardware modules in the POS machine, the difficulty in developing POS machine applications is effectively reduced, and the development cost is reduced.

Figure 10:
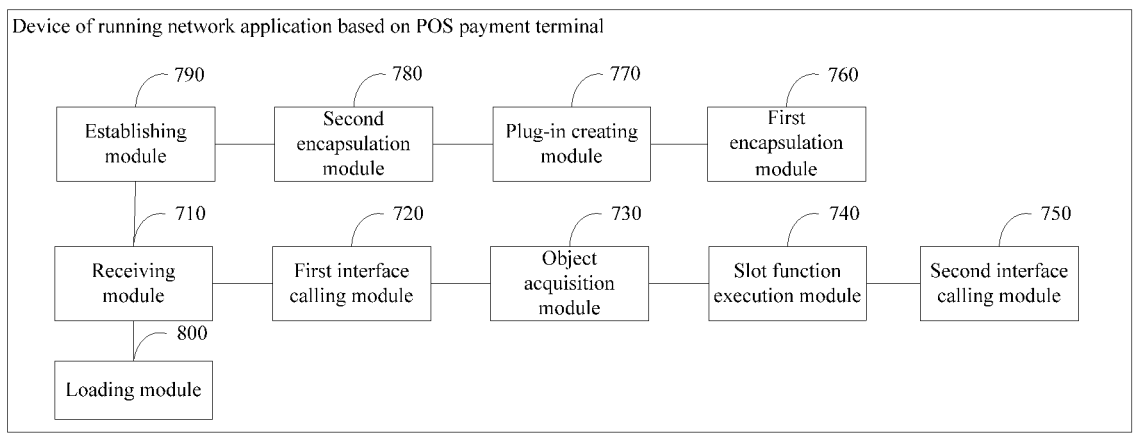
FIG. 10 depicts a block diagram of a device of running network application based on the POS payment terminal in another embodiment.

As shown in FIG. 10, in one embodiment, except that the device of running network application based on POS payment terminal includes the receiving module 710, the first interface calling module 720, the object acquisition module 730, the slot function executing module 740, the second interface calling module 750, the first encapsulation module 760, the plug-in creating module 770, the second encapsulation module 780 and the establishing module 790, this device further include a loading module 800.

The loading module 800 is configured to load and render the web application page through an embedded GUI (Graphical User Interface) system.

Figure 11:
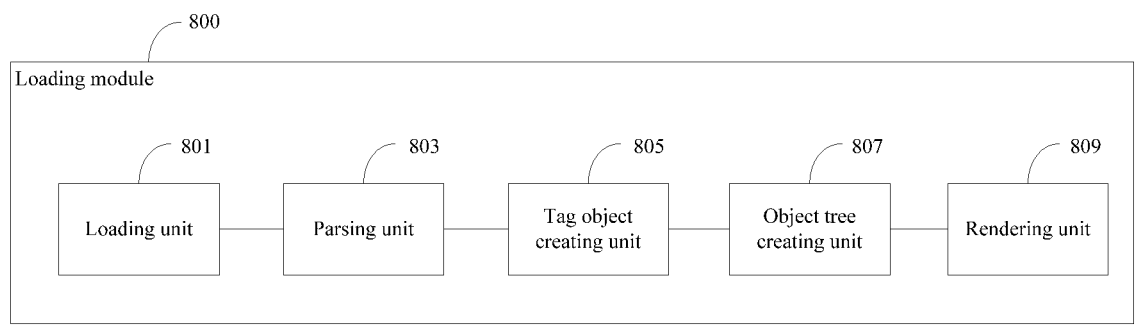
FIG. 11 depicts a block diagram of a loading module in one embodiment.

As shown in FIG. 11, in one embodiment, the loading module 800 includes a loading unit 801, a parsing unit 803, a tag object creating unit 805, an object tree establishing unit 807 and a rendering unit 809.

The loading unit 801 is configured to load a locally stored resource file of the network application page.

The parsing unit 803 is configured to parse the resource file to obtain various page tag elements contained in the network application page.

The tag object creating unit 805 is configured to create tag objects corresponding to the various page tag elements.

The object tree creating unit 807 is configured to create an object tree according to the created tag object.

The rendering unit 809 is configured to traverse and access the object tree through the embedded GUI system, and render the various tag objects contained in the object tree.

In this embodiment, the network application page may be loaded and rendered, as compared to the traditional POS machine application developed by C/C++ language, the network application has more diversified interface displays, meanwhile, the difficulty in developing the network application is lower, and the development cost is reduced.

A part or a whole of the aforesaid various modules in the device of running network application based on POS payment terminal may be implemented according to software, hardware or the combination of software and hardware. For example, in implementation of hardware, the aforesaid receiving module 710 may receive the operation on the network application based on an input device of the POS payment terminal; wherein, the input device may by a touch layer covered on the display screen, and be also be a key arranged on the outer shell of the POS payment terminal, etc. The aforesaid various modules may be embedded in or be independent of the processor of the terminal in the form of hardware, and may also be stored in the memory of the POS payment terminal in the form of software, so that the processor calls and performs the operations corresponding to the aforesaid modules.

In one embodiment, a terminal is provided, the terminal includes a memory and a processor, a computer executable instruction is stored in the memory, when the computer executable instruction is executed by the processor, the processor is caused to implement the method of running network application based on POS payment terminal.

In one embodiment, one or a plurality of non-volatile readable storage medium storing a computer executable instruction is provided, when the computer executable instruction is executed by the one or plurality of processors, the aforesaid method of running network application based on POS payment terminal may be realized.

The person of ordinary skilled in the art may be aware of that, a whole or part of flow process of implementing the method in the aforesaid embodiments of the present disclosure may be accomplished by using computer program to instruct relevant hardware. When the computer program is executed, the steps in the various method embodiments described above may be included. Where, the storage medium may be ROM (Read-Only Memory), RAM (Random Access Memory), and so on.

The various technical features in the aforesaid embodiments may be combined arbitrarily, for describing conveniently, all possible combinations of the various technical features in the embodiments described above are not described, however, the combinations of these technical features should all be considered as falling within the protection scope of the description as long as the combinations of these technical features are not contradicted with each other.

Some implementation modes of the present disclosure are described in the aforesaid embodiments, the and the implementation modes are described specifically and in detail, and should not be interpreted as limitation to the patent protection scope of the present disclosure. It should be noted that, the person of ordinary skill in the art may also make some modifications and improvements without breaking away from the inventive concept of the present disclosure, and these modifications and improvements are all included in the protection scope of the present disclosure. Thus, the protection scope of the present disclosure should be determined by the attached claims.

What is claimed is:

1. A method of running a network application based on a Point-Of-Sale (POS) payment terminal, comprising steps of:
   receiving an operation on the network application;
   calling a first interface of a JAVASCRIPT (JS) player according to the operation;
   parsing the first interface and acquiring an object corresponding to the first interface;
   transmitting a corresponding signal through the object and executing a slot function associated with the signal; and
   calling a second interface of a plug-in layer through the slot function, and calling a hardware module corresponding to the second interface to perform the operation.

2. The method according to claim 1, wherein before the step of receiving the operation on the network application, the method further comprises:
   encapsulating a system interface of the hardware module according to a preset mode;
   creating a plug-in using the encapsulated system interface, and defining the second interface provided by the plug-in;
   encapsulating the second interface according to a module definition standard to obtain the first interface of the JS layer; and
   registering the plug-in and establishing a correspondence relationship between the second interface and the first interface.

3. The method according to claim 2, wherein the step of registering the plug-in and establishing the correspondence relationship between the second interface and the first interface comprises:
   creating the corresponding object according to the first interface and creating a signal in the object; and
   creating and defining a slot function associated with the signal created in the object according to the second interface.

4. The method according to claim 1, further comprising:
   loading and rendering a web application page through an embedded graphical user interface system, before the step of receiving the operation on the network application.

5. The method according to claim 4, wherein the step of loading and rendering the web application page through the embedded graphical user interface system comprises:
   loading a locally stored resource file of a network application page;
   parsing the resource file to obtain various page tag elements contained in the network application page;
   respectively creating tag objects corresponding to the various page tag elements;
   creating an object tree according to the created tag objects; and
   traversing and accessing the object tree through the embedded graphical user interface system, and rendering the tag objects contained in the object tree.

6. A terminal, comprising a memory and a processor, the memory stores a computer executable instruction, wherein when the computer executable instruction is executed by the processor, the processor is caused to perform following steps of:
   receiving an operation on a network application;
   calling a first interface of a JAVASCRIPT (JS) layer according to the operation;
   parsing the first interface and acquiring an object corresponding to the first interface;
   transmitting a corresponding signal through the object and executing a slot function associated with the signal; and
   calling a second interface of a plug-in layer through the slot function and calling a hardware module corresponding to the second interface to perform the operation,
   wherein the memory stores additional computer executable instructions corresponding to the steps performed by the processor and the additional computer executable instructions are included in the terminal.

7. The terminal according to claim 6, wherein when the computer executable instruction is executed by the processor, before the processor is caused to perform the step of receiving the operation on the network application, the processor is further caused to perform steps of:
   encapsulating a system interface of the hardware module according to a preset mode;
   creating a plug-in using the encapsulated system interface, and defining the second interface provided by the plug-in;
   encapsulating the second interface according to a module definition standard to obtain the first interface of the JS layer; and
   registering the plug-in and establishing a correspondence relationship between the second interface and the first interface.

8. The terminal according to claim 7, wherein the step of registering the plug-in and establishing the correspondence relationship between the second interface and the first interface comprises:
   creating the corresponding object according to the first interface and creating a signal in the object; and
   creating and defining a slot function associated with the signal created in the object according to the second interface.

9. The terminal according to claim 6, wherein when the computer executable instruction is executed by the processor, before the processor is caused to perform the step of receiving the operation on the network application, the processor is further caused to perform steps of:
   loading and rendering a web application page through an embedded graphical user interface system.

10. The terminal according to claim 9, wherein the step of loading and rendering the web application page through the embedded graphical user interface system comprises:
    loading a locally stored resource file of a network application page;
    parsing the resource file to obtain various page tag elements contained in the network application page;

respectively creating tag objects corresponding to the various page tag elements;

creating an object tree according to the created tag objects; and traversing and accessing the object tree through the embedded graphical user interface system, and rendering the tag objects contained in the object tree.

11. One or a plurality of non-volatile non-transitory computer readable storage medium storing a computer executable instruction, wherein when the computer executable instruction is executed by one or a plurality of processors, the one or plurality of processors are caused to perform following steps of:

receiving an operation on a network application;

calling a first interface of a JAVASCRIPT (JS) layer according to the operation;

parsing the first interface and acquiring an object corresponding to the first interface;

transmitting a corresponding signal through the object and executing a slot function associated with the signal; and calling a second interface of a plug-in layer through the slot function and calling a hardware module corresponding to the second interface to perform the operation, wherein the one or plurality of non-volatile non-transitory computer readable storage medium stores additional computer executable instructions corresponding to the steps performed by the one or plurality of processors and the additional computer executable instructions are included in the one or plurality of non-volatile non-transitory computer readable storage medium.

12. The non-volatile non-transitory computer readable storage medium according to claim 11, wherein when the computer executable instruction is executed by one or a plurality of processors, before the one or plurality of processors are caused to perform the step of receiving an operation on the network application, the one or plurality of processors are further caused to perform steps of:

encapsulating a system interface of the hardware module according to a preset mode;

creating a plug-in using the encapsulated system interface, and defining the second interface provided by the plug-in;

encapsulating the second interface according to a module definition standard to obtain the first interface of the JS layer; and registering the plug-in and establishing a correspondence relationship between the second interface and the first interface.

13. The non-volatile non-transitory computer readable storage medium according to claim 12, wherein the step of registering the plug-in and establishing the correspondence relationship between the second interface and the first interface comprises:

creating the corresponding object according to the first interface and creating a signal in the object; and creating and defining a slot function associated with the signal created in the object according to the second interface.

14. The non-volatile non-transitory computer readable storage medium according to claim 11, wherein when the computer executable instruction is executed by the one or the plurality of processors, before the one or the plurality of processors are caused to perform the step of receiving an operation on a network application, the one or the plurality of processors are further caused to perform steps of:

loading and rendering a web application page through an embedded graphical user interface system.

15. The non-volatile non-transitory computer readable storage medium according to claim 14, wherein the step of loading and rendering the web application page through the embedded graphical user interface system comprises:

loading a locally stored resource file of a network application page;

parsing the resource file to obtain various page tag elements contained in the network application page;

respectively creating tag objects corresponding to the various page tag elements;

creating an object tree according to the created tag objects; and traversing and accessing the object tree through the embedded graphical user interface system, and rendering the tag objects contained in the object tree.

* * * * *